United States Patent [19]

Juguin et al.

[11] 4,254,294
[45] Mar. 3, 1981

[54] POLYMERIZATION REACTIONS IN THE PRESENCE OF A CATALYST CONTAINING ALUMINUM OXIDE, BORON OXIDE AND HALOGEN

[75] Inventors: Bernard Juguin, Rueil Malmaison; Jean-Pierre Franck, Bougival; Jean-François Le Page; Gabriel de Gaudemaris, both of Rueil Malmaison, all of France

[73] Assignee: Institut Francais du Petrole, Rueil-Malmaison, France

[21] Appl. No.: 96,588

[22] Filed: Nov. 21, 1979

[30] Foreign Application Priority Data

Nov. 21, 1978 [FR] France .................... 78 33160

[51] Int. Cl.$^3$ ...................... C08F 4/52; C08F 4/12
[52] U.S. Cl. ...................... 585/525; 252/430; 252/432; 526/185; 526/186; 526/189; 526/195; 585/457
[58] Field of Search ............... 526/195, 185, 186, 189; 585/525, 457; 252/430, 432

[56] References Cited

U.S. PATENT DOCUMENTS

| | | | |
|---|---|---|---|
| 3,448,064 | 6/1969 | Tomomatsu | 526/195 |
| 4,062,805 | 12/1977 | Franck et al. | 252/430 |
| 4,092,371 | 5/1978 | Franck et al. | 585/457 |

*Primary Examiner*—William F. Hamrock
*Attorney, Agent, or Firm*—Millen & White

[57] ABSTRACT

Process for polymerizing olefinic hydrocarbons at a temperature from 0° to 90° C., preferably from 20° to 80° C. in the presence of a catalyst containing aluminum oxide and, per part by weight thereof, boron oxide in a proportion of 0.01 to 1, preferably 0.07 to 0.15 part by weight and halogen in a proportion of 0.5 to 20%, preferably 4 to 12%, said catalyst resulting from the reaction of an aluminum compound of formula $AlX_yR_{(3-y)}$ where X is halogen, R is a hydrocarbon radical and y is selected from 1, 3/2, 2 and 3, with a carrier containing aluminum oxide and boron oxide in a proportion to aluminum oxide from 1 to 100%.

8 Claims, No Drawings

POLYMERIZATION REACTIONS IN THE PRESENCE OF A CATALYST CONTAINING ALUMINUM OXIDE, BORON OXIDE AND HALOGEN

This invention concerns a process for polymerizing hydrocarbons, particularly for polymerizing olefinic hydrocarbons in order to produce synthetic oils, gasolines of high octane number, jet fuels, base products for platicizers such as hexenes, heptenes or nonenes, base products for detergents such as dodecenes, hydraulic fluids and oils of high viscosity index and low pour point.

Polymerization processes used on industrial scale make use, as catalyst, of aluminum trichloride or complexes or solutions thereof. These processes have however a disadvantage: in view of the formation of complexes between the olefinic hydrocarbons and the aluminum chloride, it is necessary to proceed with two additional steps, one for decomposition of the complex, the other for a thorough washing of the reaction products. If these treatments were not performed, the resulting hydrocarbons would have unacceptable chlorine contents.

According to this invention, the polymerization reactions are performed in the presence of a solid catalyst, of excellent stability and which does not lead to the formation of undesirable complexes with olefinic hydrocarbons; this catalyst (already used for alkylation of aromatic hydrocarbons: U.S. Pat. Nos. 4,062,805 and 4,092,371) contains aluminum and boron. It further contains, by weight, 0.5 to 20%, preferably 4 to 12%, of halogen. In the catalyst, boron oxide amounts to 0.01 to 1 part by weight per part by weight of aluminum oxide. Preferably, for the considered polymerizations, the molar ratio of boron oxide to alumina is from 0.07 to 0.15.

This catalyst is obtained by contacting an aluminum halide or aluminum hydrocarbyl halide with a carrier containing aluminum oxide and boron oxide. This treatment is advantageously followed with heating at a temperature from 300° to 800° C. Although the foundamental mechanism of this operation is still not well known, it seems that a true reaction takes place between aluminum halide or aluminum hydrocarbyl halide and the boron and aluminum oxides mixture. The presence of boron oxide appears, moreover, to be essential; as a matter of fact, when a catalyst is prepared by the same method, in the absence of boron oxide, and is used in polymerization, it is observed that this catalyst quickly losses its initial activity and that the polymerizate contains a substantial amount of aluminum compound or complex. The effect of boron is thus to provide for a better fixation of the aluminum compound on the catalyst so that the aluminum compound cannot be carried away by the reaction products of the polymerization reaction.

As above mentioned, for one part by weight of aluminum oxide, the usual amount of boron oxide is from 0.01 to 1 part by weight. Additional refractory oxides may be present, for example acid oxides such as silica, although this is not preferred.

Aluminum oxide is preferably used in a form having, either during the admixture of the components or after calcination at 300°–800° C., a substantial specific surface, preferably at least 5 m$^2$ per gram, so that the final catalyst itself has a substantial specific surface, advantageously at least 5 m$^2$/g and preferably from 50 to 100 m$^2$/g.

Boron oxide may be introduced as such or preferably in the form of a compound decomposable to boron oxide by heating. It is preferred to make use of anyone of the boric acids.

The mixture of aluminum oxide with boron oxide may be performed in any known manner, for example by mechanical admixture of powders, in dry state or in the presence of water, or, preferably, by impregnating alumina by means of an aqueous solution of boric acid. In lieu of oxides or acids, the starting compounds may be compounds decomposable to oxides by heating, particularly nitrates. After this admixture, a drying step is performed, if necessary, for example by heating at 100°–500° C.

During the step of contacting the mixture of aluminum and boron oxides with an aluminum halide or an aluminum hydrocarbyl halide, the operation is conducted preferably in the absence of water and oxygen, by making use of dry oxides, in order to avoid an useless and sometimes noxious secondary reaction of hydrolysis of the aluminum halide or aluminum hydrocarbyl halide.

The reaction of the aluminum halide or aluminum hydrocarbyl halide with the mixture of aluminum and boron oxides may be effected at ordinary temperature or at any temperature compatible with the stability of the reactants, usually between −20° and 250° C. or more.

As above mentioned, the amount of aluminum halide or aluminum hydrocarbyl halide, calculated as halogen, to be introduced in the catalyst, usual amounts to 0.5 to 20%, preferably 4 to 12% of the alumina weight.

The fixation of the aluminum halide or aluminum hydrocarbyl halide on the carrier being generally relatively rapid and complete, it is not usually necessary to use an excess of said halide.

The aluminum hydrocarbyl halide is used preferably as a solution in a non-reacting solvent, for example a hydrocarbon containing preferably from 5 to 20 carbon atoms per molecule or a halogenated hydrocarbon.

The aluminum or aluminum hydrocarbyl halides comply with the general formula $AlX_yR_{(3-y)}$ wherein y is 1, 3/2, 2 or 3, X is halogen, preferably chlorine, the case being however excepted where simultaneously X is fluor and y is equal to 3, and R is a monovalent hydrocarbon radical containing, for example, from 1 to 20 carbon atoms. There can be used, for example, diethylaluminum chloride, dodecylaluminum dichloride, diisobutyl aluminum chloride, diethylaluminum fluoride, benzylaluminum dichloride, phenylaluminum dichloride, cyclohexylaluminum dichloride or ethylaluminum sesquichloride.

The aluminum trihalide may be for example a trichloride or a tribromide, e.g. aluminum trichloride or aluminum tribromide. This compound may be introduced in the catalyst by impregnation or by sublimation; in the case of $AlCl_3$ and of sublimation, the temperatures are about 185° to 400° C. On the contrary, when proceeding by impregnation, any temperature compatible with the existence of an imprenation liquid phase may be convenient. Aluminum trifluoride does not provide for an active catalyst.

The fixation of the halide on the carrier is performed under neutral or reducing atmosphere, for example in the presence of nitrogen, hydrogen, methane, under normal pressure or a different pressure.

After the fixation of the aluminum halide or aluminum hydrocarbyl halide, the material may be brought to 300°–800° C., preferably 400°–600° C. The duration of this treatment is usually from 10 minutes to 24 hours, these values being however not limitative. As a matter of fact, at very high temperatures, the treatment may be considerably shortened.

The polymerizable olefins are preferably those having from 2 to 16 carbon atoms, for example: ethylene, propylene, 1- and 2-butenes, isobutylene, pentenes and isopentenes, hexenes, propylene trimer or tetramer, diisobutylene.

The polymerization temperature is selected from 0° to 90° C., preferably from 20° to 80° C. and more particularly from 30° to 75° C. The pressure is usually from 10 to 100 atmospheres and preferably from 20 to 60 atmospheres.

Although it is possible to proceed with a dispersed catalyst, it is however preferred to circulate the reactants through the catalyst in fixed bed. The flow rate (V.V.H.) is, for example, from 0.25 to 20 and preferably from 0.5 to 2 (volume of olefinic hydrocarbon per volume of catalyst and per hour).

The reaction being strongly exothermic, the temperature will be maintained to an acceptable value by removing heat excess in a known manner, for example by cooling the reactor walls, vaporizing a portion of the liquid stream, recycling a portion of the reactor effluent, previously cooled, diluting the olefin with a saturated hydrocarbon such as propane, butane, pentanes, hexanes or heptanes.

The operation is preferably performed by adding a halogen promoter to the reactants, either continuously or periodically, particularly a halohydric acid, for example hydrochloric acid or hydrofluoric acid, or a hydrocarbyl mono- or poly-halide, for example methyl choloride, ethyl chloride, tert. butyl chloride, chloroform, carbon tetrachloride of dichlorodifluoromethane. This promoter is usually present in an amount from 10 to 20,000 ppm by weight with respect to the hydrocarbons to polymerize. It is advantageous to recycle the unconverted reactants as well as the gas effluent from the reactor, containing halogen compounds, so that the halogen consumption may be very low.

The desired reaction product (which is then separated by distillation from the effluent obtained by the present process), is substantially free of halogen. It is thus unnecessary to subject it either to the usual treatments of decomposition of the chloroaluminic complexes, or to a thorough washing.

A particular example of application of the olefin polymerization is a process for manufacturing hydraulic fluids, process which consists of treating an olefinic charge issued from a steam cracking unit and selected either from a cut containing a major portion of olefins with four carbon atoms per molecule or from a cut containing a major portion of propylene or from a cut containing a major portion of propylene and olefins with four carbon atoms per molecule, said process being characterized in that:

(a) said charge is subjected to polymerization at a temperature from 0° to 200° C., in the presence of the above-described catalyst, (b) the polymerization effluent is fractionated so as to obtain at least, on the one hand, a cut having a final distillation point of about 180° to 200° C. (preferably about 180° C.), said cut being partially hydrogenated before being used as gasoline of high octane number, and on the other hand, a cut whose initial distillation point is about 180°–200° C., (c) the cut of distillation point higher than about 180° C. is subjected to complete hydrogenation, and (d) the effluent from the total hydrogenation step is fractionated so as to obtain at least:

($\alpha$) a cut distilling between about 180° and 250° C., complying with the specifications JET A-1 given in Table I, ($\beta$) a cut distilling between about 250° and 330° C., complying with specifications LHM and AIR 3520 A given in Table II.

Optionally a cut 330° C.$^{30}$ is recovered.

The above process for manufacturing hydraulic fluids with the catalyst of the present invention, provides improved hydraulic fluids as compared to those obtained by the processes wherein the polymerization is conducted in the presence of silica-alumina, the processes making use of silica-alumina being themselves substantially superior to those wherein the polymerization catalyst is of the phosphoric acid type.

EXAMPLE 1 (comparative example without boron oxide)

In a tubular reactor of stainless steel, there is arranged a fixed bed of 50 g of alumina having a specific surface of 200 m$^2$/g and a pore volume of 0.5 cc/g, previously roasted for one hour in air at 500° C.

The reactor is then scavenged with a dry hydrogen stream at a rate of 20 liters of hydrogen per hour, a temperature of 450° C., under a pressure of 40 atmospheres. After that, the temperature is decreased to 150° C. and the pressure maintained at 40 atmospheres; there is then introduced, by means of a pump, 300 cc of a solution containing 0.25 mole per liter of $Al_2Cl_3(C_2H_5)_3$ in hexane, at a rate of 60 cc/h.

After 5 hours of circulation, the pump is stopped and the temperature decreases to 60° C. An analysis, performed on the solid, shows that the latter contains 10.2% by weight of chlorine. There is then injected over the so-formed catalyst a charge whose composition by weight is as follows:

| | |
|---|---|
| isobutene | 23% |
| 1-butene | 18% |
| cis + trans 2-butenes | 10% |
| isobutane | 14% |
| n-butane | 35% |
| | 100% |

The operating conditions were as follows:

| | |
|---|---|
| pressure | 40 kg/cm$^2$ |
| temperature | 60° C. |
| space velocity (VVH) | 1 liter/liter of catalyst/hour |
| hydrogen flow rate | 10 liters/hour. |

The chlorinated promoter is tert.butyl chloride in a proportion of 0.5% by weight with respect to the charge.

The reaction product, analyzed by mass spectrometry, had the following composition by weight:

| | |
|---|---|
| monoolefins | 62% |
| paraffins | 28% |
| cycloolefins | 4.5% |

| | |
|---|---|
| -continued | |
| cycloparaffins | 4.3% |
| aromatics | 0.7% |

The carbon distribution was as follows:

| | |
|---|---|
| $C_8$ to $C_{11}$ | 16% |
| $C_{12}$ to $C_{14}$ | 37% |
| $C_{15}^+$ | 47% |

Moreover the analysis of the products obtained after 75 hours and 200 hours of operation shows that the latter respectively contain, after washing with a 1/10 N sodium hydroxide solution and neutralization (for removing HCl):

| | |
|---|---|
| chlorine ppm | 125 and 180 |
| aluminum ppm | 900 and 1300 |

It has been observed, during this heat, that the reaction products were strongly coloured to a brown-red colour which indicates the presence of complexes of the olefinic $AlCl_3$ type.

EXAMPLE 2

In the same tubular reactor as in example 1, there is arranged a fixed bed of 50 g of a boron oxide-aluminum oxide carrier containing 90% by mole of alumina and 10% by mole of boron oxide obtained by co-mixing, extrusion and calcination of a mixture of alumina hydrate and boric acid.

After the product has been roasted at 500° C. and the reactor scavenged with a dry hydrogen stream as described in example 1, 300 cc of a solution containing 0.25 mole per liter of $Al_2Cl_3(C_2H_5)_3$ in hexane are introduced at a rate of 60 cc/h.

After 5 hours of circulation, the temperature is decreased to 60° C. An analysis performed on the so-obtained catalyst shows that the latter contains b 10.2% by weight of chlorine. The charge of example 1 is passed through the catalyst under the same operating conditions as in example 1, with the same chlorinated promoter.

The reaction product, analyzed by mass spectrometry, had the following composition by weight:

| | |
|---|---|
| monoolefins | 64% |
| paraffins | 27% |
| cycloolefins | 4% |
| cycloparaffins | 4.3% |
| aromatics | 0.7% |

The carbon distribution was as follows:

| | |
|---|---|
| $C_8$ to $C_{11}$ | 15 |
| $C_{12}$ to $C_{14}$ | 37 |
| $C_{15}^+$ | 48 |

The product had the following characteristics:
bromine number: 59
specific gravity at 20° C.: 0.802

The analysis of the obtained products, as well after 75 hours as after 200 hours of operation, has shown that the latter respectively contained, after washing with a 0.1 N sodium hydroxide solution and neutralization:

chlorine ppm < 10
aluminum ppm < 1
The products were perfectly clear and colourless.

This liquid phase has then been fractionated in a column with 35 theoretical plates, with a reflux rate of 8/1, so as to obtain 2 cuts, i.e.:

a first cut, having a final distillation point of 180° C., amounting to 16% by weight of the total liquid phase, and a second cut 180° C.+, amounting to 84% by weight of the total liquid phase.

The first cut, whose final distillation point is 180° C., has the following characteristics:

| | |
|---|---|
| specific gravity at 20° C. | 0.736 |
| clear research octane number | 100 |
| research octane number with an ethyl content of 0.5%. | 102 |

This first cut has been partially hydrogenated in the presence of a catalyst based on palladium, deposited on alumina (0.4% by weight of palladium), in the following operating conditions:

| | |
|---|---|
| temperature | 140 to 220° C. |
| pressure | 30 bars |
| hourly flow rate of the liquid charge | 2 times the catalyst volume |
| molar ratio hydrogen/charge | 2/1 |

For a hydrogenation rate of 50%, the characteristics of the gasoline were the following:

| | |
|---|---|
| specific gravity at 20° C. | 0.730 |
| clear research octane number | 98 |
| research octane number with an ethyl content of 0.5%. | 102 |

For a hydrogenation rate of 80%, the gasoline characteristics were the following:

| | |
|---|---|
| specific gravity at 20° C. | 0.726 |
| clear research octane number | 95 |
| research octane number with an ethyl content of 0.5%. | 102 |

The second cut 180° C.+ has been completely hydrogenated in the presence of a catalyst on platinum deposited on alumina (0.4% of platinum by weight), in the following operating conditions:

| | |
|---|---|
| temperature | 280° C. |
| pressure | 50 bars |
| hourly flow rate of the liquid charge | one time the volume of catalyst |
| molar ratio hydrogen/charge | 5/1 |

After complete hydrogenation, the product was fractionated under vacuum and three cuts were recovered:

a 180°–250° C. cut amounting to 25% by weight of the total product, a 250°–330° C. cut amounting to 51% by weight of the total product, a 330° C.+ cut amounting to 8% by weight of the total product.

The 180°–250° C. cut had the characteristics shown in Table I, with reference to the corresponding values of the specifications JET A-1.

It can be observed that this cut complies with all the specifications concerning the jet fuels. Such a cut, in view of its low aromatic content is also an excellent solvent.

TABLE I

| CHARACTERISTICS | SPECIFICATIONS JET A - 1 | HYDROGENATED 180–250° C. CUT |
|---|---|---|
| specific gravity at 20° C. | 0.771 to 0.821 | 0.778 |
| aromatics content: % vol | 20 maxi | 0.2 |
| olefins content: % vol | 5 maxi | <0.1 |
| naphthalene content: % vol | 3 maxi | <0.01 |
| acid number: mg KOH/g | 0.1 maxi | 0.05 |
| actual gums: mg/100 cc | 7 maxi | 4 |
| potential gums: mg/100 cc | 14 maxi | 5 |
| doctor test | negative | negative |
| corrosion with copper blade | 1a maxi | 1a |
| corrosion with silver blade | 1 maxi | 0 |
| flasch point in closed cup: °C. | 38 mini–66 maxi | 55 |
| crystallization point: °C. | −50° C. maxi | −63° C. |
| smoke point: mm | 25 mini | 37 |
| viscosity at −34.4° C. csk | 15 maxi | 10 |

The 250°–330° C. cut had the characteristics shown in Table II, in relation with the specifications LHM for motor-cars and aircraft AIR 3520 A.

It can be observed that the considered cut complies with all the specifications.

The product had the further advantage of being substantially inert with respect to different types of synthetic rubbers and plastic materials.

TABLE II

| CHARACTERISTICS | AIR 3520 A SPECIFICATIONS | LHM SPECIFICATIONS | HYDROGENATED 250–330° C. CUT |
|---|---|---|---|
| specific gravity at 20° C. | | | 0.824 |
| pour point °C. | <−60° C. | <−40° C. | −67° C. |
| viscosity at −40° C. csk | | | 570 |
| viscosity at 37.8° C. csk | | | 6.6 |
| viscosity at 50° C. csk | | ≅4 | 4.8 |
| viscosity at 98.9° C. csk | ≅1.5 | | 2 |
| viscosity index | | >60 | 89 |
| aniline point °C. | | 88° C. | 91° C. |
| cleveland point °C. | >82 | >110° C. | 121° C. |
| initial boiling point °C. | | >240° C. | 250° C. |

By adding to said hydrogenated 250°–330° C. cut a convenient viscosity index improver, there was obtained a hydraulic liquid complying with specification SAE 71R1, as shown in Table III below.

TABLE III

| | HYDRAULIC LIQUID | SPECIFICATION SAE 71R1 |
|---|---|---|
| Composition % weight | | |
| hydrogenated 250–330° C. cut | 94% by weight | |
| alkyl polymethacrylate (viscosity index improver) | 6% by weight | |
| Characteristics: | | |
| viscosity at −40° C. csk | 1350 | <2000 |
| viscosity at 37.8° C. csk | 19.1 | |
| viscosity at 50° C. csk | 13.2 | |
| viscosity at 98.9° C. csk | 5.9 | >5 |
| viscosity index | 203 | |

EXAMPLE 3

The starting feed charge is an olefinic C₄ cut of lower isobutene content than the charge of the preceding examples and having the following composition by weight:

| | |
|---|---|
| isobutene | 13% |
| 1-butene | 20% |
| cis + trans 2-butenes | 22% |
| isobutane | 4% |
| n-butane | 40.5% |
| tert. butyl chloride | 0.5% |

This charge is passed over the catalyst of example 2 under the following operating conditions:

| | |
|---|---|
| pressure | 50 kg/cm² |
| temperature | 35° C. |
| space velocity VVH | 1 liter/catalyst liter/hour |
| hyrogen flow rate | 10 liters/hour |

The reaction product, analyzed by mass spectrometry, had the following composition by weight:

| | |
|---|---|
| monoolefins | 83.8% |
| paraffins | 9.5% |
| cycloolefins | 3% |
| cycloparaffins | 3% |
| aromatics | 0.7% |

The carbon distribution was as follows:

| | |
|---|---|
| C₈ to C₁₁ | 6% |
| C₁₂ to C₁₄ | 21% |
| C₁₅⁺ | 73% |

The product further exhibited the following characteristics:

| | |
|---|---|
| bromine number | 44 |
| specific gravity at 20° C. | 0.814 |

The analysis of the products obtained after 100 and 300 hours of operation has shown that the latter respectively contained, after whashing with a 0.1 N sodium hydroxide solution and neutralization for removing the hydrochloric acid:
chlorine ppm: <10
aluminum ppm: <1

After fractionation in a column of 35 theoretical plates there was obtained a first fraction having a final point of 180° C., amounting to 8% by weight of the total liquid phase and a second fraction of 180° C.+ amounting to 92% by weight of the total liquid phase.

The first cut of final point 180° C. had the following characteristics:

| | |
|---|---|
| specific gravity at 20° C. | 0.732 |
| clear research octane number | 96 |
| research octane number with an ethyl content of 0.5%. | 100 |

This cut has been partially hydrogenated in the presence of the palladium catalyst of example 2, under the same operating conditions as in said example 2.

For a hydrogenation rate of 50%, the gasoline characteristics were the following:

| | |
|---|---|
| specific gravity at 20° C. | 0.724 |
| clear research octane number | 93 |
| research octane number with an ethyl content of 0.5%. | 100 |

For a hydrogenation rate of 80%, the gasoline characteristics were the following:

| | |
|---|---|
| specific gravity at 20° C. | 0.722 |
| clear research octane number | 88 |
| research octane number with an ethyl content of 0.5%. | 97 |

The second cut 180° C.+ has been completely hydrogenated in the presence of the platinum catalyst of example 2 and under the same operating conditions as in said example 2.

After complete hydrogenation, the product fractionated under vacuum and 3 cuts were recovered:
a 180°-250° C. cut amounting to 13% by weight of the total product,
a 250°-330° C. cut amounting to 42% by weight of the total product,
a 330° C.+ cut amounting to 37% by weight of the total product.

The 200°-250° C. cut had the characteristics shown in Table IV below:

TABLE IV

| CHARACTERISTICS | SPECIFICATIONS JET A-1 | HYDROGENATED 180-250° C. CUT |
|---|---|---|
| specific gravity at 20° C. | 0.771 to 0.821 | 0.805 |
| aromatics content % vol | 20 maxi | 0.3 |
| olefins content % vol | 5 maxi | <0.1 |
| naphthalene content % vol | 3 maxi | <0.01 |
| acid number: mg KOH/g | 0.1 maxi | 0.05 |
| actual gums mg/100 cc | 7 maxi | 3 |
| potential gums mg/100 cc | 14 maxi | 4 |
| doctor test | negative | negative |
| corrosion with copper blade | 1a maxi | 1a |
| corrosion with silver blade | 1 maxi | 0 |
| flash point in closed cup: °C. | 38 mini-66 maxi | 59 |
| crystallization point °C. | −50° C. maxi | −64° C. |
| smoke point: mm | 25 mini | 35 |
| viscosity at −34.4° C.: csk | 15 maxi | 14 |

This cut complies with all the specifications concerning the jet fuels and is also an excellent solvent of the "white spirit" type, in view of its low aromatics content.

The 250°-330° C. cut had the characteristics shown in Table V.

TABLE V

| CHARACTERISTICS | AIR 3520 A SPECIFICATIONS | LHM SPECIFICATIONS | HYDROGENATED 250-330° C. CUT |
|---|---|---|---|
| specific gravity at 20° C. | | | 0.826 |
| pour point °C. | <−60° C. | <−40° C. | −64° C. |
| viscosity at −40° C.: csk | | | 460 |
| viscosity at 37.8° C.: csk | | | 5.3 |
| viscosity at 50° C.: csk | | ≅4 | 3.9 |
| viscosity at 98.9° C.: csk | ≅1.5 | | 1.4 |
| viscosity index | | >60 | 92 |
| cleveland point: °C. | >82° C. | >110° C. | 120° C. |
| initial boiling point: °C. | | >240° C. | 250° C. |

This cut complies with the specifications concerning the hydraulic fluids.

By adding a convenient viscosity index improver to said hydrogenated 250°-330° C. cut, there was obtained a hydraulic liquid conforming to specification SAE 71R1 as shown in Table VI below.

The product was, in addition, substantially inert with respect to different types of synthetic rubbers and plastic materials.

TABLE VI

| | HYDRAULIC LIQUID | SPECIFICATION SAE 71R1 |
|---|---|---|
| Composition: % by weight | | |
| hydrogenated 250–330° C. cut | 94% by weight | |
| alkyl polymethacrylate | 6% by weight | |
| Characteristics: | | |
| viscosity at −40° C. csk | 1200 | <2000 |
| viscosity at 37.8° C. csk | 17.1 | |
| viscosity at 50° C. csk | 12.6 | |
| viscosity at 98.9° C. csk | 5.4 | >5 |
| viscosity index | 215 | |

The 330° C.+ cut was then fractionated under vacuum in two cuts:
a 330°–380° C. cut amounting to 17% by weight of the total product,
a 380° C.+ amounting to 20% of the same total product. This latter cut has the following characteristics:

| viscosity at 98.9° C. | 4.1 csk |
|---|---|
| viscosity index | 112 |
| freezing point | −41° C. |
| specific gravity at 20° C. | 0.836 | and it is accordingly convenient as oil base for combustion engines.

EXAMPLE 4

The feed charge was an olefinic $C_3$ cut having the following composition by weight:

| propene | 52% |
|---|---|
| isobutene | 2% |
| propane | 43% |
| isobutane | 2.5% |
| tert. butyl chloride | 0.5% |

This charge is passed over the catalyst of example 2 under the following operating conditions:

| pressure | 30 kg/cm$^2$ |
|---|---|
| temperature | 60° C. |
| space velocity VVH | 2 liters/catalyst liter/hour |
| hydrogen flow rate | 10 liters/hour |

The reaction product, analyzed by mass spectrometry, had the following composition by weight:

| monoolefins | 89.7% |
|---|---|
| paraffins | 6% |
| cycloolefins | 2% |
| cycloparaffins | 2% |
| aromatics | 0.3% |

The carbon distribution was as follows:

| $C_6$ | 10% |
|---|---|
| $C_7$ | 1.2% |
| $C_8$ | 0.8% |
| $C_9$ | 29% |
| $C_{10}$ | 1.9% |
| $C_{11}$ | 0.4% |
| $C_{12}$ | 49% |
| $C_{13}$ | 0.3% |
| $C_{14}$ | 0.2% |
| $C_{15}^+$ | 7.2% |

The type of catalyst used was consequently perfectly adapted to the production of dodecenes, base products for detergents.

EXAMPLE 5

The starting charge was the olefinic $C_3$ cut of example 4 and the catalyst that of example 2. The operating conditions were as follows:

| pressure | 25 kg/cm$^2$ |
|---|---|
| temperature | 80° C. |
| space velocity VVH | 3 liters/catalyst liter/hour |
| hydrogen flow rate | 10 liters/hour |

The reaction product, analyzed by mass spectrometry, had the following composition by weight:

| monoolefins | 94.5% |
|---|---|
| paraffins | 2.2% |
| cycloolefins | 1.5% |
| cycloparaffins | 1.5% |
| aromatics | 0.3% |

The carbon distribution was as follows:

| $C_6$ | 24% |
|---|---|
| $C_7$ | 3% |
| $C_8$ | 2.4% |
| $C_9$ | 53% |
| $C_{10}$ | 1% |
| $C_{11}$ | 0.3% |
| $C_{12}$ | 14% |
| $C_{13}$ | 0.2% |
| $C_{14}$ | 0.1% |
| $C_{15}^+$ | 2% |

The type of catalyst used was according very well adapted to the production of nonenes and hexenes, which are base products for plasticizers.

EXAMPLE 6

The starting charge was a $C_3$–$C_4$ olefinic cut having the following composition by weight:

| propane | 2.80% |
|---|---|
| isobutane | 6.39% |
| n-butane | 2.50% |
| propene | 29.23% |
| isobutene | 3.68% |
| 1-butene | 22.23% |
| cis 2-butene | 12.93% |
| trans 2-butene | 19.61% |
| propadiene | 0.01% |
| 1,3-butadiene | 0.12% |
| chloride tert. butyl | 0.50% |

This charge was passed over the catalyst of example 2, in the following operating conditions:

| pressure | 40 kg/cm$^2$ |
|---|---|
| temperature | 70° C. |
| VVH | 2 |
| hydrogen flow rate | 10 liters/hour |

The reaction product, analyzed by mass spectrometry, had the following composition:

| | |
|---|---|
| moolefins | 93% |
| paraffins | 3.2% |
| cycloolefins | 1.7% |
| cycloparaffins | 1.8% |
| aromatics | 0.3% |

The carbon distribution was as follows: (in %)

| | |
|---|---|
| $C_6$ | 7.4% |
| $C_7$ | 37.3% |
| $C_8$ | 27.3% |
| $C_9$ | 10.5% |
| $C_{10}$ | 5% |
| $C_{11}$ | 3.5% |
| $C_{12}^+$ | 9% |

The catalyst is thus well adapted to the production of heptenes which are base products for plasticizers.

EXAMPLE 7

The starting charge was the same as in example 1. This charge was passed over the catalyst of example 2, under the following operating conditions:

| | |
|---|---|
| pressure | 25 kg/cm$^2$ |
| temperature | 70° C. |
| VVH | 3 |
| hydrogen flow rate | 10 liters/hour |

The resulting product was then fractionated in a column with 35 theoretical plates, with a reflux rate of 8/1, so as to obtain two cuts, i.e:
a first cut, having an initial distillation point of 65° C. and
a final distillation point of 200° C., amounting to 88% by weight of the total liquid phase, and a second 200° C.+ cut amounting to 12% by weight of the total liquid phase.

The first 65°-200° C. cut had the following characteristics:

| | |
|---|---|
| specific gravity at 20° C. | 0.747 |
| clear research octane number | 101 |
| research octane number with 0.5%. ethyl content | 103 |

This cut has been partially hydrogenated, in the presence of a catalyst containing palladium deposited on alumina (0.4% by weight of palladium), in the following operating conditions:

| | |
|---|---|
| temperature | 140 to 220° C. |
| pressure | 30 bars |
| space velocity (VVH) | 2 liters/catalyst liter/hour |
| molar ratio of hydrogen/charge | 2/1 |

For a hydrogenation rate of 50%, the characteristics of the gasoline were as follows:

| | |
|---|---|
| specific gravity at 20° C. | 0.739 |
| clear research octane number | 100 |
| research octane number with 0.5% . ethyl content | 103 |

For a hydrogenation rate of 80%, the gasoline characteristics were the following:

| | |
|---|---|
| specific gravity at 20° C. | 0.736 |
| clear research octane number | 97 |
| research octane number with 0.5% . ethyl content | 103 |

The type of catalyst used is thus very well adapted to the production of gasolines of high octane number.

What is claimed is:

1. A process for the production of liquid polymers comprising polymerizing at least one olefinic hydrocarbon at a temperature from 0° to 90° C., in the presence of a catalyst containing aluminum oxide, boron oxide and halogen, the catalyst containing by weight 0.5 to 20% of halogen and 0.01 to 1 part by weight of boron oxide per part by weight of aluminum oxide, said catalyst being manufactured by reacting an aluminum compound of formula $AlX_yR_{(3-y)}$, wherein X is halogen, R is a hydrocarbon radical and y is 1, 3 with a carrier containing aluminum oxide and boron oxide, the ratio by weight of boron oxide to aluminum oxide being from 0.01 to 1.

2. A process according to claim 1, wherein the polymerization is conducted at a temperature from 20° to 80° C.

3. A process according to claim 2, wherein the catalyst contains from 4 to 12% by weight of halogen.

4. A process according to claim 2, wherein the molar ratio of boron oxide to alumina is from 0.07 to 0.15.

5. A process according to claim 1, wherein the catalyst manufacture is followed with heating to a temperature from 300° and 800° C.

6. A process according to claim 1, wherein the mixture of aluminum oxide and boron oxide results from the impregnation of alumina by means of an aqueous solution of boric acid.

7. A process according to claim 1, wherein the compound of formula $AlX_yR_{(3-y)}$ is used in a sufficient amount to introduce from 0.5 to 20% by weight of halogen in the catalyst.

8. A polymerization process according to claim 1, conducted in the presence of an additional halogenated promoter, used in a proportion from 10 to 20,000 ppm by weight with respect to the olefinic hydrocarbon to polymerize.

* * * * *

UNITED STATES PATENT AND TRADEMARK OFFICE
CERTIFICATE OF CORRECTION

PATENT NO. : 4,254,294

DATED : March 3, 1981

INVENTOR(S) : JUGUIN ET AL

It is certified that error appears in the above—identified patent and that said Letters Patent is hereby corrected as shown below:

COLUMN 14, line 34: reads: "is a hydrocarbon radical and y is 1,3 with a car-"

should read: --is a hydrocarbon radical and y is 1, 3/2, or 2 with a car---.

Signed and Sealed this

Ninth Day of June 1981

[SEAL]

Attest:

RENE D. TEGTMEYER

Attesting Officer — Acting Commissioner of Patents and Trademarks